July 7, 1931.  L. A. COREY  1,813,566
GAUGE
Filed July 10, 1930
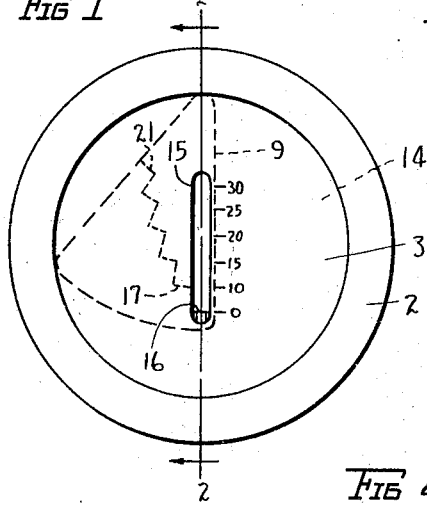
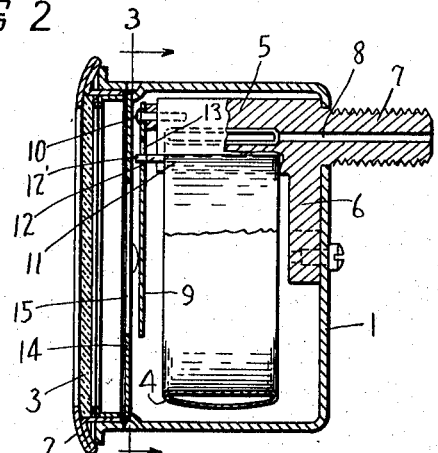
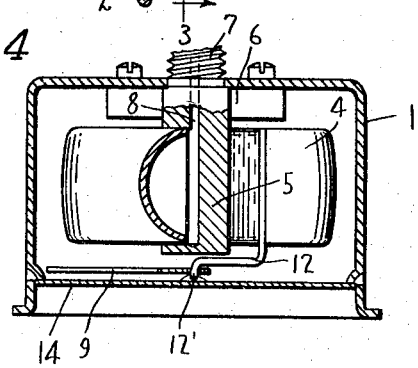
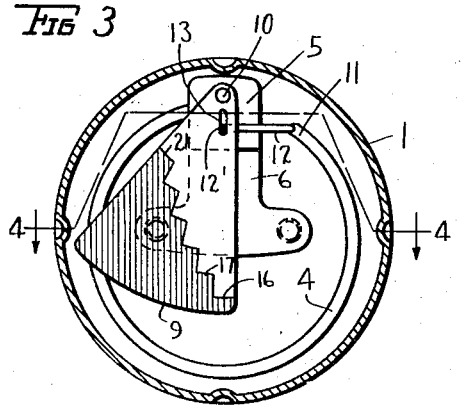
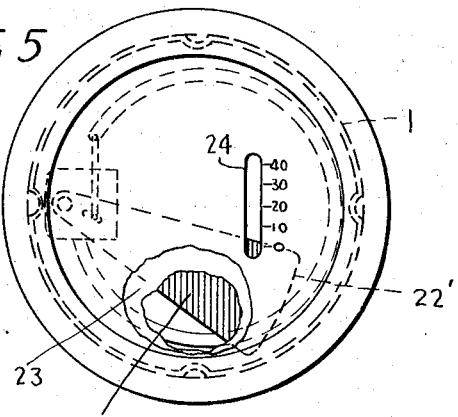
INVENTOR
Lorin A. Corey
BY
Staley & Welch
ATTORNEYS Patented July 7, 1931

1,813,566

UNITED STATES PATENT OFFICE

LORIN A. COREY, OF LA CROSSE, WISCONSIN, ASSIGNOR, BY MESNE ASSIGNMENTS, TO GENERAL INSTRUMENT COMPANY, OF LA CROSSE, WISCONSIN, A CORPORATION OF WISCONSIN

GAUGE

Application filed July 10, 1930. Serial No. 467,036.

This invention relates to improvements in indicators for gauges, it more partcularly relating to improvements on that type of gauge in which the indication is made by a liquid column, such for instance as the well known indicator on automobiles for indicating the quantity of gasoline in the tank, although the improvements are equally applicable to other forms of gauges, such as oil level gauges, water level gauges, ammeters, voltmeters, temperature indicators, etc.

An object of the invention is to provide a simple, inexpensive instrument in which an old form of mechanism well known for its reliability is utilized in combination with indicator devices constructed in accordance with my improved designs, enabling the user to ascertain the changes in level or pressure in a manner very similar to that used in other more expensive, less reliable instruments to which a large member of users have become accustomed to reading.

A further and more specific object of my invention is to provide an indicator for a gauge so designed as to simulate the action of a moving liquid column, usually colored, such as the well known form of liquid column gasoline indicator for automobiles.

In the accompanying drawings:

Fig. 1 is a front elevation of a pressure gauge in which my improved features are incorporated.

Fig. 2 is a vertical axial section on the line 2—2 of Fig. 1.

Fig. 3 is a transverse section on the line 3—3 of Fig. 2.

Fig. 4 is a horizontal section on the line 4—4 of Fig. 3.

Fig. 5 is a front elevation of a modification.

In the drawings I have illustrated one exemplification of my invention in the form of a pressure gauge in which the indicating mechanism is operated by a varying fluid pressure such as in the well known types of gasoline and oil gauges in common use on automobiles, although my invention contemplates any well known means for operating a movable indicator employed in any of the well known forms of gauges, whether fluid operated, electrically operated, or operated in any other well known way. In the particular gauge shown in the drawings, there is employed a Bourdon tube which is responsive to either varying liquid or gaseous pressure as the element for moving my improved indicator, although any other form of movable means which is responsive to either fluid pressure or other mechanical or electrical operating devices may be used.

Referring to the drawings, 1 is a casing in which the mechanism is housed, 2 being a frame in which a glass 3 is carried. The Bourdon tube 4 is mounted in the usual manner, one end being soldered in a recess in the projecting portion 5 of a member 6 which is secured to the inner rear side of the casing. Extending rearwardly from the member 6 is a threaded hollow stem 7 to which the piping for the fluid (not shown) is connected, the bore 8 being the means of communication between the pipe and the interior of the Bourdon tube.

My improved indicator is shown at 9 and is pivotally mounted on a pin 10 inserted in the forward side of the projection 5 in such manner as to be freely movable thereon. This indicator is connected to the free end 11 of the Bourdon tube by means of a rod 12 which is secured to the free end, this rod 12 having an outwardly turned end 12' passing through a radial slot 13 in the indicator 9. On changes of pressure within the Bourdon tube, the free end moves and by the connection with the indicator, the latter is swung to and fro on the pivot pin 10. Referring to Fig. 3, an indicator is shown in the present instance as being a triangularly shaped member, the forward surface of which is colored, in this case a red color being employed.

In the present case the red color is applied to a portion only of the indicating member in the form of a series of steps.

A dial plate 14 is suitably supported in the forward portion of the casing directly in front of the indicator, the front face of which is colored differently from the color of the indicator. In the center of the dial is a slot 15 and alongside of the slot is a series of marks and numerals representing a scale. Referring to Fig. 1, a portion of the red imprint is seen at the lowermost end of the slot, the red imprint being coincident with the mark opposite the zero, which indicates that the Bourdon tube is unaffected by any pressure therein. At this position of the indicator, the imprint is applied to that portion of its surface which is visible at the slot 15, and only to the height represented by the character 16 coincident with the zero mark. The first step 16, as well as all other steps, is arranged to be concentric with the pivot pin. Upon increase or decrease of the pressure within the Bourdon tube, the indicator must move in accordance with the movement of the free end of the tube, as, for example, when the tube is affected by a pressure (or vacuum) of ten units, a second step 17 of the red imprint is applied at a height coincident with the mark opposite the numeral 10 of the scale, and so on with subsequent increases in pressure.

When the several steps have been imprinted, the appearance of the indicator will be as shown in Fig. 3, the steps, as represented by 16, 17 and 21, being concentrically disposed, and approximately slightly wider than the slot 15, the lines or edges joining the successive steps being radially disposed. The entire lower portion of the indicator surface is covered by the imprint, so that at the highest pressure for which the instrument is designed, the slot appears to be solid color, and the impression on the observer is that full pressure or capacity has been attained, even though the numerals of the scale are not noticed. The effect of this indicator is to simulate a moving or varying column of colored liquid.

In Fig. 5 a modified form of gauge is shown, in which the indicator 22 is so disposed that as it rises and falls behind the dial 23, the appearance of the colored imprint on the outer extremity 22' of the indicator through the slot 24 has the same optical effect, the upper edge 22'' serving to represent the liquid level of the moving colored column previously referred to.

In manufacturing, it may be found more convenient to calibrate the scale according to the positions assumed by the indicator and to the pre-arranged design for the imprint. This method is preferable in the event the instrument is to be designed to show at a remote point the depth or quantity of liquid in a container having a conformation other than perfectly square or rectangular.

In the use of indicators employing a movable column of liquid one of the disadvantages is the necessity of servicing the instruments from time to time by adding an additional amount of the liquid in order to secure accurate indications, a defect which is overcome by my improved indicator.

Having thus described my invention, I claim:

1. In an indicating instrument, a member having a vertical slot, a pivoted indicator, and means adapted to respond to varying conditions for swinging said indicator about its pivot in line with the slot to varying degrees in the length of the slot, the effective indicating portion of said indicator being an edge thereof which extends across the slot in a direction not departing appreciably from a line perpendicular to the length of the slot.

2. In an indicating instrument, a member having a vertical slot, a pivoted indicator, and means adapted to respond to varying conditions for swinging said indicator about its pivot in line with the slot to varying degrees in the length thereof, the effective indicating portion of said indicator being impressed with a color different from said slotted member adjacent the slot, and having an edge which extends across the slot in a direction not departing appreciably from a line perpendicular to the length of the slot.

3. In an indicating instrument, a member having a vertical slot, a pivoted indicating member having a series of distinctive indicating steps, and means adapted to respond to varying conditions for moving said steps in successive order across said slot or retracting the same therefrom, each step having an edge which extends across the slot in a direction not departing appreciably from a line perpendicular to the length of the slot.

4. In an indicating instrument, a member having a vertical slot, a pivoted indicating member having a series of distinctive indicating steps, and means adapted to respond to varying conditions for moving said steps in successive order across said slot or retracting the same therefrom, the stepped portion of said indicator having a color distinct from the color of the slotted member adjacent the slot thereof, and having an edge which extends across the slot in a direction not departing appreciably from a line perpendicular to the length of the slot.

5. In an indicating instrument, a member having a vertical slot, a movable non-fluid indicating member back of said slotted member, and means adapted to respond to varying conditions for moving said indicator in a general vertical direction so as to expose the same in varying degrees through the slot, the effective indicating portion of said indicator being an edge thereof which extends across the slot in a direction not departing appreciably from a line perpendicular to the length of the slot.

6. In an indicating instrument, a member having a vertical slot, a movable non-fluid indicating member back of said slotted member, and means adapted to respond to varying conditions for moving said indicator in a general vertical direction so as to expose the same in varying degrees through the slot, that portion of the indicator which is exposed having a color distinct from the color of the slotted member adjacent the slot, and having an edge which extends across the slot in a direction not departing appreciably from a line perpendicular to the length of the slot.

In testimony whereof, I have hereunto set my hand this 17th day of June, 1930.

LORIN A. COREY.